Patented July 7, 1931

1,813,440

UNITED STATES PATENT OFFICE

BENTON DALES, OF AKRON, OHIO, ASSIGNOR TO THE B. F. GOODRICH COMPANY, OF NEW YORK, N. Y., A CORPORATION OF NEW YORK

RUBBER COATED ARTICLE AND METHOD OF MAKING SAME

No Drawing.     Application filed August 12, 1927. Serial No. 212,610.    REISSUED This invention relates to the art of covering articles with protective coverings of rubber and like materials and has for an object to provide a practical method for superposing on articles such protective coverings and to provide articles so covered.

It is well known that coverings of rubber, formed by drying films of rubber dispersions either in organic solvents or in aqueous media, do not adhere tightly to metals or other non-porous materials. Special methods have been employed for securing a firm attachment of rubber to metals, which methods so far as I am aware, are not well adapted for covering articles with thin films or for covering irregularly shaped articles. The purpose of this invention is to provide a method for performing these operations, namely, for producing strongly adherent thin layers of rubber to metallic and other articles, and for covering with an impervious integral body of rubber irregularly shaped articles, which method shall be practically applicable to industrial or factory procedure.

The method of this application comprises fundamentally these steps: applying to the article to be protected one or more coatings of a liquid dispersion of a tacky rubber isomer, drying after each coating operation, superposing thereon one or more layers of a liquid dispersion of rubber, each layer being allowed to dry to some extent before the superposition of a succeeding layer, and vulcanizing the rubber.

The rubber isomers employed in this application are preferably the tough, non-friable isomers produced by treating rubber at elevated temperatures with isomerizing agents for rubber. Such reaction products have been prepared by the treatment of rubber with a wide variety of reagents which under the influence of heat convert the rubber to an isomeric form having the same empirical formula but a less chemical unsaturation than rubber and a marked change in specific gravity, from about 0.92 for rubber to about 0.97–1.00 for the rubber isomer. The preparation of these products has been described in prior publications and forms per se no part of the present invention. The term "rubber isomer" as herein used is intended to include all rubber derivatives of the above indicated character, however prepared, whether in a pure or impure state, and whether admixed with other ingredients or not.

The liquid dispersions of the rubber isomer may be in the form of either a dispersion in organic solvents or a dispersion in aqueous media. Where organic solvents are employed as the dispersing media, the liquid dispersions should have such degree of fluidity as to form smooth coherent films on the articles being covered. A satisfactory dispersion is formed by admixing one pound of the rubber isomer in one gallon of benzol, or similar organic solvent, although more dilute or more concentrated liquid dispersions may be employed. This liquid dispersion may be applied to the article by dipping, spraying or brushing, and best results are obtained when two or more thin coats are applied, drying between each coat. Where liquid dispersions of the rubber isomer in aqueous media are used, a more concentrated dispersion may be employed since the aqueous dispersions have a greater fluidity than do dispersions in organic solvents. Such dispersions may be applied to the article to be covered by dipping, spraying, brushing or other analogous method.

When the article has received one or more foundation coatings of the rubber isomer and the coatings have had at least a part of their liquid content removed, as by evaporation, it is ready for receiving the coatings of the liquid dispersion of rubber which may be made by dispersing crude, vulcanized or reclaim rubber composition in organic solvents, or with the aid of dispersing agents into aqueous media, or, alternatively, latex either in natural state or modified by dilution or concentration and/or by the addition of compounding materials, may be employed. The liquid dispersions of rubber should preferably contain compounding and vulcanizing agents and ultra-accelerators which cure at normal or slightly elevated temperatures are preferably employed. Where liquid dispersions of rubber in organic solvents are employed, a 5 to 15 percent dispersion of rubber is satisfactory and may be applied by dipping, spraying or brushing and where more than one coat is employed, the films permitted to dry between the successive coating operations. Where aqueous dispersions of rubber, or latex, are employed, the rubber content of the dispersion may vary widely, from 15 to 60 percent, depending upon the amount and character of the compounding ingredients and the thickness desired for any single coating or film, and whether the coating is to be applied by dipping, spraying or brushing.

When the article has received its outer protective coating of rubber, it is permitted to thoroughly dry. If vulcanizing agents and sufficiently active accelerators have been incorporated in the rubber, the rubber may become vulcanized upon standing at room temperatures; if less active accelerators have been employed, the covered article may be subjected to a heated fluid at a temperature and for a time sufficient to effect proper vulcanization of the rubber. Alternatively, the rubber may be vulcanized by the so-called acid or vapor cures, or by any other suitable process.

The following examples are herein given as illustrative of ways in which the process of this application have been successfully carried out, but are by no means exhaustive of the possibilities of the present invention.

*Example 1.*—An exhaust fan propeller constructed of sheet steel and comprising a multiplicity of curved vanes or blades was given a protective coating of rubber to protect the metal of the propeller from deterioration, due to the action thereon of the corrosive gases handled thereby, using the hereinabove indicated process. This was accomplished in the following manner. The surfaces of the metal were cleansed by pickling, rinsing and drying, and two coats of a liquid dispersion of a rubber isomer were applied thereto. The rubber isomer was prepared by admixing 7½ parts by weight of phenol sulfonic acid into 100 parts of rubber (plantation crepe) and heating in an unconfined mass for 6 hours at 140° C. The resulting rubber isomer was washed, dried, and then dispersed by stirring with benzol in the proportion of fourteen ounces of the rubber isomer to one gallon of benzol. This liquid dispersion was then sprayed onto the metal propeller to form a complete covering film thereon and after drying a short time was given a second coating of the rubber isomer dispersion, which was also permitted to dry. A natural latex (30 percent rubber) was compounded to contain 100 parts by weight of rubber, 4 parts sulfur, 10 parts zinc oxide and 0.75 parts of tetramethyl thiuram disulphide, and this compounded latex was sprayed over the rubber isomer coated propeller to give a finish or outer coat of rubber. It was allowed to dry and the assembly was then subjected to a dry heat at 75° C. for twenty minutes. The protective covering thus provided was smooth, tough and adhered to the metal with great tenacity. Under actual service tests in exhausting corrosive gases, these propellers have shown no deterioration whatsoever, and a large number of such propellers have been subsequently treated in the manner herein described for use in the chemical industry.

*Example 2.*—A steel cylinder having numerous perforations and utilized as a strainer in certain industrial operations in which corrosive liquids containing abrasive materials are employed was given a serviceable protective coating by a somewhat modified process. The cylinder was first dipped in a liquid dispersion of a rubber isomer the latter being of the same type employed in the previous example. The coated article was set to drain, and when dry was given several coatings by dipping of an aqueous dispersion of rubber made by masticating reclaimed rubber with casein paste and adding water gradually thereto during mastication, each coating of the dispersed reclaim rubber being permitted to dry prior to the application of a succeeding coating. A firm, strongly adherent, tough covering of rubber was thus provided.

*Example 3.*—In order to demonstrate the high resistivity of these films to acids and acid fumes, test pieces were prepared as herein indicated and subjected to an extremely sever acid test.

(a) Strips of iron were sand-blasted to clean thoroughly the surface and were then given three coats, with drying between each coat, of a liquid dispersion of a rubber isomer in benzol, followed by nine dip-coats in a cement of rubber and benzol. The rubber films thus obtained were about 1/64 inch thick.

(b) Strips of iron were sand-blasted, dip-coated same as in (a) and the rubber film cured by dipping in a 2.5 percent solution of sulfur chloride in carbon tetrachloride for 5 minutes.

(c) Sandblasted iron strips were given three dip-coats of the rubber isomer, as in (a) and then ten dip coats, with drying between coats, of a vulcanizable rubber cement. The rubber films were then cured by subjecting to dry heat in an electric oven for 75 minutes at 96° C.

The test pieces coated with rubber by each of the methods hereinabove indicated were immersed in full strength commercial muriatic acid. Upon removal from the acid after two weeks' immersion, the test pieces coated by methods (b) and (c) were in substantially the same condition as when immersed; the films of test pieces (a), which are unvulcanized, were blistered somewhat. All rubber films showed good adhesion to the metal. These tests clearly indicate that rubber films applied as herein described form a good protective covering for metal against acids and acid fumes, and that vulcanized acids rubber films are better in acid resisting properties than are those made of unvulcanized rubber.

While each of the specific examples hereinabove given have referred to the covering of steel with rubber, such examples have been chosen because of the well recognized difficulty of firmly adhering an impervious rubber covering to metals. The process is, however, applicable to substantially all articles of whatsoever material, satisfactory results having been obtained in covering articles of wood, paper, leather, cement and the like.

The term "rubber" is employed in the specification and claims in a generic sense to include caoutchouc, balata, gutta percha and similar gums, either in their natural condition as latex, or coagulated, or vulcanized, or reclaimed, and whether or not admixed with other materials such as compounding ingredients or vulcanizing agents.

While various embodiments of my invention have been hereinabove indicated, it will be understood that the invention of this application is not limited to the specific examples herein recited but that numerous modifications and variations thereof may be made without departing from the principles of my invention.

I claim:

1. The method of providing an article with a protective covering of rubber which comprises applying to the article one or more coatings of a liquid dispersion of a rubber isomer, permitting each coating to dry at least in part before application of a succeeding coating, and then building up a rubber covering of substantial thickness by superposing thereon a plurality of layers of rubber from a liquid dispersion thereof, each layer being dried at least in part before a succeeding layer is applied.

2. The method of providing an article with a protective coating of rubber which comprises depositing on the article a layer of a rubber isomer from a liquid dispersion thereof, then depositing thereon a layer of rubber from an aqueous dispersion thereof and drying the deposited layers.

3. The method of providing a metallic article with a protective coating which comprises depositing on the metal a layer of a rubber isomer from an aqueous dispersion thereof, then depositing thereon a layer of rubber from an aqueous dispersion thereof and drying the deposited layers.

4. The method of providing an article with a thin tough impervious strongly adherent covering of rubber which comprises depositing on the article of a layer of a rubber isomer from an aqueous dispersion thereof, removing at least in major part the liquid from said layer, and then depositing thereon a layer of a vulcanizable rubber composition from an aqueous dispersion thereof, drying the depositing layers and vulcanizing.

5. The method of providing an article with a thin tough impervious strongly adherent covering of rubber which comprises depositing on the article a layer of a rubber isomer from an aqueous dispersion thereof, then depositing thereon a layer of vulcanizable composition from an aqueous dispersion thereof, drying the deposited layers and vulcanizing.

In witness whereof I have hereunto set my hand this 3rd day of August, 1927.

BENTON DALES.